United States Patent
Irwin

(10) Patent No.: US 10,798,885 B2
(45) Date of Patent: *Oct. 13, 2020

(54) GRANULAR COMPOSITIONS AND METHODS FOR DROUGHT MITIGATION

(71) Applicant: Ecologel Solutions, LLC, Ocala, FL (US)

(72) Inventor: Richard K. Irwin, Ocala, FL (US)

(73) Assignee: Ecologel Solutions, LLC, Ocala, FL (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/882,471

(22) Filed: Jan. 29, 2018

(65) Prior Publication Data

US 2018/0146629 A1    May 31, 2018

Related U.S. Application Data

(63) Continuation of application No. 14/292,161, filed on May 30, 2014, now Pat. No. 9,877,434.

(60) Provisional application No. 61/829,019, filed on May 30, 2013.

(51) Int. Cl.
*A01G 22/00* (2018.01)
*B01J 20/24* (2006.01)
*A01G 25/00* (2006.01)

(52) U.S. Cl.
CPC ............. *A01G 22/00* (2018.02); *A01G 25/00* (2013.01); *B01J 20/24* (2013.01)

(58) Field of Classification Search
CPC .................................................. C05G 3/0058
See application file for complete search history.

(56) References Cited

U.S. PATENT DOCUMENTS

| | | |
|---|---|---|
| 3,137,618 A | 6/1964 | Pearce |
| 3,600,852 A | 8/1971 | Burke et al. |
| 3,647,458 A | 3/1972 | Tagliafico et al. |
| 3,820,976 A | 6/1974 | Wells et al. |
| 4,047,925 A | 9/1977 | Barer |
| 4,252,831 A | 2/1981 | Gleekler et al. |
| 4,353,949 A | 10/1982 | Kyminas et al. |
| 4,389,394 A | 6/1983 | Drucker |
| 4,624,694 A | 11/1986 | DelliColli |
| 4,702,496 A | 10/1987 | Hume, III |
| 5,082,500 A | 1/1992 | Nachtman et al. |
| 5,422,352 A | 6/1995 | Astrup |
| 5,614,008 A | 3/1997 | Escano et al. |
| 5,814,123 A | 9/1998 | Hansen |
| 5,865,869 A | 2/1999 | Hansen |
| 2001/0042494 A1 | 11/2001 | Welshimer et al. |

OTHER PUBLICATIONS

North Country Organics particle size conversion table (accessed via http://norganics.com/index-2/technical-articles/particle-size-conversion-table/ on Jan. 19, 2017).*

* cited by examiner

*Primary Examiner* — Kortney L. Klinkel
(74) *Attorney, Agent, or Firm* — Akerman LLP; Peter A. Chiabotti

(57) ABSTRACT

The present application relates to methods and compositions and compositions for watering plant roots, and more particularly, to water soluble granular compositions for application to grass and other root bearing plants, the granules including a wood, mineral and binder granule impregnated with a root watering composition having a humectant as its principle constituent, and methods of application and use of the granular compositions.

10 Claims, No Drawings

GRANULAR COMPOSITIONS AND METHODS FOR DROUGHT MITIGATION

CROSS-REFERENCE TO RELATED APPLICATION

This patent application is a continuation of U.S. patent application Ser. No. 14/292,161, filed May 30, 2014, which claims the benefit of U.S. Provisional Patent Application No. 61/829,019 filed May 30, 2013, both of which are hereby incorporated by reference in their entireties.

FIELD

The present application relates to methods and compositions for watering plant roots, and more particularly, to water soluble granular compositions for application to grass and other root bearing plants, the granules including a humectant as its principle constituent, and methods of application and use of the granular material.

BACKGROUND

Drought mitigation technologies can be categorized as physical, biological, or chemical. These technologies are typically implemented when water is unavailable, has been restricted due to natural deficiencies in rainfall, or has been otherwise limited through governmental regulation.

Physical means of drought mitigation in the fields of agriculture, landscaping, sports turf, and similar industries refers to the implementation of water absorbent compounds within the soil strata. These compounds are generally comprised in whole or in part of poly-acrylic acid sodium salt, also known as sodium polyacrylate or "superabsorbent polymer." Such compounds absorb many times their weight in water and slowly release it to the surrounding media. This technology can extend the time plants can survive drought conditions, though the volume of water used to sustain the plants must be provided in advance to hydrate the compounds.

Biological means of drought mitigation are demonstrated in technologies such as genetic engineering and through methods and applications which increase the overall health of the plant, thereby making the plant more resilient when faced with drought conditions. Genetic engineering can isolate genetic markers which allow for a genetically engineered specimen to sustain itself on less water as compared to a naturally occurring specimen. This methodology is typically employed in regard to water management to allow for greater efficiency in harvesting (ex. genetically modified potatoes that retain less water aid in mechanical harvesting.

Chemical means of drought mitigation involve the use of hygroscopic and humectant compounds which attract and hold water. This methodology requires chemical engineering that allows such compounds to remain in the root-zone and bind to tiny root hairs on the specimen. These chemical compounds are then able to attract water vapor which is present in the soil strata, though unusable to plants, and convert it into water droplets which are then transferred through the root system. Drought mitigation through chemical means is also seen through the introduction of surfactants (also known as "wetting agents"), which are products designed to lower the surface tension of liquid, thereby allowing the applied water to spread out more uniformly instead of channeling. This may increase the efficiency of the water that is applied, thereby conferring greater actual benefit to the plant specimen than with water alone.

SUMMARY

In an embodiment, a granular composition for root watering can include a plant root watering composition and a water-dissolvable granular material comprising a mineral, wood fiber and at least one saccharide binder. The plant root watering composition can include humectant from 25 to 75 parts by volume, thickener from 0 to 10 parts by volume, binder from 0 to 10 parts by volume, wetting agent from 0 to 25 parts by volume, and water from 75 to 25 parts by volume.

In an alternative embodiment, the plant root watering composition can include humectant from 30 to 60 parts by volume, binder from 0.2 to 5.0 parts by volume, thickener from 0.2 to 0.5 parts by volume, wetting agent from 0.2 to 15.0 parts by volume and water from 60 to 30 parts by volume. Also, the root watering composition can have a pH in the range of 4.5-7, the mineral can be granite or dolomite and the saccharide binder is selected from the group consisting of starch, dextrin, molasses and mixtures thereof.

In one arrangement, the granular material can include 18-25 weight-% wood fiber and 82-75 weight-% mineral and binder, at 3-12 weight-% based on the total amount of mineral and wood fiber. Additionally, the granule size can be from about 80 to 140 SGN. Alternatively, the granule size can be from about 150 to 240 SGN. Still further, the granule size can be from about 35 to 300 SGN.

Methods of preparing a granular composition for root watering are also provided. A method can include applying, by spraying, a plant root watering composition to a water-dissolvable granular material comprising a mineral, wood fiber and at least one saccharide binder to obtain an impregnated granular composition and drying the impregnated granular composition to obtain a granular composition. Another method to prepare the granular compositions includes incorporating, by mixing, the plant root watering composition with wood fiber, mineral dust, and a saccharide binder material to form a slurry-type mixture or slurry, and agglomerating the mixture to form granules.

Other methods of preparing the composition are contemplated. For example, mixing the plant root watering composition with the wood fiber and binder material(s), and then spraying this mixture over mineral dust inside a tumbler to agglomerate it, before proceeding. The plant root watering composition can include humectant from 25 to 75 parts by volume, thickener from 0 to 10 parts by volume, binder from 0 to 10 parts by volume, wetting agent from 0 to 25 parts by volume and water from 75 to 25 parts by volume.

A method of amending a soil is also provided. The method can include impregnating water-dissolvable granules comprising wood fiber, mineral and a saccharide binder with a liquid root watering composition comprising a humectant and water to obtain a granular root watering composition and distributing the granular root watering composition as an amendment to a soil. Additionally, distributing further can include distributing the granular root watering composition proximate a root location corresponding to a plant. Further, distributing further can include distributing the granular root watering composition in a layer placed in a location selected from under the soil, within the soil, on the soil, and combinations thereof. The method can also include exposing the granular root watering composition to irrigation. Distribution can further include distributing the granules proximate a root location corresponding to a plant and distributing the granules in a layer placed in a location selected from under the soil, within the soil, on the soil, and combinations thereof.

DETAILED DESCRIPTION

The present disclosure provides granular compositions comprising a composition for drought mitigation and/or plant root watering. The compositions can be stored for prolonged periods and conveniently dispensed. The compositions improve plant watering and improve a plant's ability to fight drought. Namely, the compositions increase the availability of soil moisture upon dissolution of the granules to improve plant root watering. Stated another way, the granular composition for improving plant root watering promotes moisture availability while at the same time provides practical advantages in production and application.

The granular compositions described herein comprise a dissolvable granular material combined with a humectant or hygroscopic material suitable for root watering. In general, the dissolvable granular material is comprised of mineral and wood fiber (cellulose) with at least one saccharide or polysaccharide binder, such as molasses, starch or dextrin.

In some embodiments, the humectant or hygroscopic material is a root watering composition comprises: (1) humectant from 25 to 75 parts by volume; (2) thickener from 0 to 10 parts by volume; (3) binder from 1 to 10 parts by volume; (3) optionally a wetting agent from 0 to 25 parts by volume; and (4) water from 75 to 25 parts by volume.

A more specific preferred range includes: (1) humectant 30 to 60; (2) thickener 0.2 to 0.5, (3) binder 0.2 to 5.0 (4) wetting agent 0.2 to 15.0 and (5) water 30 to 60.

Organic humectants constitute a class of materials well known in the art. An organic humectant is a member of a group of materials which attracts and releases moisture under varying humidity conditions ("ICI Specialty Chemicals 1990 Product Guide," page 2 (of record); Hacks Chemical Dictionary). Humectants which function herein for the intended purposes include, for example, sorbitol, molasses, potassium lactate, sodium lactate, glycerol, potassium acetate and sodium acetate, xylitol, erythritol, malitol, mannitol, and isomalt, calcium nitrate, and urea.

In particular, sorbitol can be used alone or in combination with potassium lactate. Blends of glycerol and/or sorbitol with the sodium or potassium salt of alpha-hydroxypropionic acid are also used. Although calcium nitrate has almost no thickening or binding properties, it adds to the humectant action of the humectant, and has a particularly strong action when blended with sorbitol and calcium lignosulfonate, enhancing the moisture retention effect.

A wetting agent facilitates the ability of a dry material to dissolve in or take up water. "Surface active agent" and "surfactant" can be used interchangably with the term wetting agent. As wetting agent, non-ionic surfactants, such as alkylpolyglucosides (APG) are preferred. APG include, for example Triton™ BG-10; Triton™ CG-50; Triton™ CG-600; Triton™ CG-650; Triton™ CG-110. The wetting agent can be any number of non-ionic surfactants, such as, Triton 101® or Tergitol™. Triton 101 is a trademark of the Rohm and Haas Corporation. Other wetting agents include Triton X100®, Ninol II-CN®, Igepal 60630®, nonyl phenol ethoxylate 9-15 mole. Other suitable wetting agents include octylphenol ethoxylate and a non-ionic surfactant/dispersant of the nonylphenol ethoxylate type available as Triton N-101® or Tergitol™ Octylphenol ethoxylate stabilizes calcium nitrate in solution, and may be best described as stabilizer rather than wetting agent.

A thickener can optionally be added. A thickener is used to affect the rheological properties of a solution.

A binder helps the humectant bind to soil or to a plant root. Suitable binders are calcium or sodium lignosulfonate, or other adhesive binders other adhesive binders, for example, those composed of a wheaten or potato dextrin. WAFEX Powder is one commercially available form of calcium lignosulfonate, and has a residual wood-sugar fraction. Norleg A is another example. WAFEX powder has both binding and surfactant properties and is also a humectant.

For example, one composition includes 35 kg potassium lactate, 195 kg sorbitol, 4 kg calcium lignosulfonate, 0.2 L teric surfactant, 48 kg calcium nitrate, and water to make up to 200 L. The pH is adjusted to 6.0-6.5 with lactic acid/KOH.

In a preferred embodiment, the root watering composition is Hydretain®. Hydretain® is a liquid consisting of an organic humectant, thickener, binder material, wetting agent, and water. Hydretain® contains ingredients described in U.S. Pat. Nos. 5,814,123 and 5,865,869, each of which is hereby incorporated by reference in its entirety.

As noted above, the dissolvable granular material is comprised of mineral and wood fiber with at least one polysaccharide binder. By dissolvable it is meant that the granule is substantially completely dissolved or dispersed by immersion in water for 1 hour. In some embodiments, the granule is substantially completely dissolved or dispersed by immersion in water for 50 minutes, 40 minutes, 30 minutes, 20 minutes, 10 minutes, or 5 minutes.

Wood (cellulose) fibers serve as a structural skeleton for the granules. They also contribute to the formation of cavities (pores) within the granules, thus reducing product weight. Wood fibers usable may be made from sawdust and similar waste or by-product of hardwood and softwood manufacturing facilities. The required size fibers, from about 10 microns to about 2 mm, are obtained by passing the wood through a hammer mill and employing screening to select out fibers of the desired sizes.

The mineral in the granule is a filler which gives the granule its desired specific weight. Fillers that may be used include kaolin, titanium dioxide, sodium bicarbonate, calcium carbonate, and mixtures thereof. In a preferred embodiment, this filler is a lime derivative, e.g., lime itself, fly ash, dolomite, calcium carbonate, gypsum, and mixtures thereof. However, any inert, preferably low pH mineral that has a high specific weight and is capable of supplying fine particles may be used. Calcium carbonate or agricultural lime are examples. Typically, the dry mineral filler has a particle size range within the range 10 to 100 microns, and has a moisture content of less than 12 weight-%. Generally, any mineral filler with particles smaller than 150-Mesh U.S. Sieve Series will be operative. In general, the mineral filler has a bulk density of less than about 75 pounds per cubic foot.

Another class of mineral filler that can be used in the present invention is granite fines. Granite fines are available as a by-product from granite quarries and from operations where granite is cut or engraved. Granite fines thus are economical, and their use in the present invention has environmental advantages, have relatively low liquid absorption, have a low pH, and are chemically stable.

A (poly)saccharide binder component can give strength and elasticity to the granules. The binder can also control the rate of dissolvability of the carrier granules by appropriately combining different binders. For example, dextrin binders are quick dissolving, while native starch granules dissolve more slowly. Binders suitable for use include, but are not limited to, starch-based and dextrin-based adhesive binders. Starch and dextrin adhesive binder compositions are readily available, low in cost, and easy to apply from water dispersion.

In general the granular material comprises 18-25 weight-% wood fiber and 82-75 weight-% mineral. The amount of binder is 3-12 weight-%, based on the total amount of mineral and wood fiber.

Preferred dissolvable granular material includes EcoGranule® products available from Cycle Group Inc., Mocksville, N.C., including EcoGranule® LT, composed of 15-40% wood fibers, 65-85% granite and 3-7% organic binder; EcoGranule® HW+Dolomite, composed of 15-30% wood fibers, 65-82% dolomite and 3-7% organic binder; EcoGranule® HW+Granite, composed of 12-30% wood fibers, 65-82% granite and 3-7% organic binder; and most preferably EcoGranule® QD, composed of 10-40% wood fibers, 50-85% dolomite and 1-10% organic binder.

Other suitable dissolvable granular material is described in U.S. Patent Application Publication No. 20070098752 to Glio, entitled "Quick dissolving carrier granules."

Still other suitable dissolvable granular material includes dolomitic limestone pellets from The Andersons, Maumee, Ohio, including DGLite®, DGPro® L150, DH46 and DH66 dolomitic limestone pellets comprised of limestone ($CaCO_3$ and $MgCO_3$), dolomite limestone, calcium lignosulfonate, molasses, sodium lignosulfonate, wood or particle board flour and ammonium lignosulfonate.

To manufacture the granules, a homogenous dry mixture is prepared and then is pelletized and the pellets are dried and screened. More specifically, a method for making a granule includes the steps of: forming a mixture comprising dry wood fibers, dry mineral filler, and binder; pelletizing the mixture in a pin mixer and disc or pan pelletizer to form substantially spherical granules; and screening the granules to select granules which, for instance, pass a 10-Mesh U.S. Sieve Series screen but are retained on a 40-Mesh U.S. Sieve Series screen.

The granule size can be adapted for particular uses. For some applications, a granule size from about 80 to 140 SGN is preferable. SGN is a unit of measure used to indicate particle size. The number is equal to the size in millimeters multiplied by 100. For landscape applications a slightly larger size may be appropriate, about 150 to 240 SGN. For a seed coating, a smaller size, such as about 35 SGN, is suitable.

It should be noted that the granular material is dissolvable in water and that as the granule dissolves, the root-watering composition is released. Granular forms of root watering materials utilizing granules composed primarily of paper, corn cobs, and clays have been found to be ineffective for preparing granular root watering compositions, due to the inability of the granule to release a humectant-containing root watering composition. Indeed, since the humectant-containing root watering compositions described herein adhere to soil and organic material, and the granular material in the present disclosure is composed of organic material, it is unexpected that the root-watering compositions are released from granular compositions upon watering and/or irrigation.

In order to prepare the granular compositions comprising a composition for drought mitigation and/or plant root watering, the granules are soaked or impregnated with the composition for improving plant root watering by spraying the granules with the composition for improving plant root watering, then dried either at ambient temperature or with the application of heat. Preferably, the granules are heat dried, via a conveyer system, or in a tumbler dryer, for example. In this method, it should be noted that enough of the composition for improving plant root watering is added to the granules to dissolve them, but only enough to impregnate them with the composition. In this embodiment, no additional lubricant, binder or anti-agglomeration agent is necessary to keep the granules free-flowing.

In this embodiment, the root watering composition currently sprayed onto the granule at a ratio of about 1.8 kg root watering composition to about 16.3 kg granules to a ratio of about 6.8 kg root watering composition to about 11.3 kg granules.

In a preferred embodiment, 0.14 kg (0.307 pounds) of Hydretain is used for each 0.45 kg (1 pound) of granules. Hydretain is then 23.48 percent of the wet weight. When the optimum drying is achieved Hydretain will lose about 25 to 50%, typically 40% of its weight. The finished weight of the dried granule will then contain 15.6% of a super concentrated Hydretain. The amount of Hydretain can be varied as noted above, including in a range of from 50% less than to as much as 50% higher than the preferred amount.

In another embodiment, the components for making the root watering composition are combined with the homogenous dry mixture of ingredients to make the granules before the drying step. In this embodiment, it should be noted that certain ingredients in the granular dry ingredients and in the root watering composition may overlap and thus the quantities of the ingredients can be adjusted accordingly. For example, the wood fibers/flours in the granular dry ingredients can also function as a thickener in the root watering composition and dextrin in the granular dry ingredients can also function as a binder in the root watering composition. Other overlapping ingredients include lignosulfonates and molasses.

Another method to prepare the granular compositions includes incorporating, by mixing, the plant root watering composition with wood fiber, mineral dust, and a saccharide binder material to form a slurry-type mixture, and agglomerating the mixture to form granules. For example, the mixture can be optionally conditioned and agglomerated to form small particles, followed by agglomerating the mixture to form granules.

"Conditioning" refers to the process of slowly adding more of any of the constituent ingredients to reach a desired consistency. It may also refer to forcing heated, cooled, or ambient air into the mixture to further yield an appropriate moisture content and/or temperature of the mixture that is suitable for agglomerating the particles together. Conditioning is used to obtain the desired consistency and ingredient ratios that will properly coagulate together.

For example, if the slurry appears too "airy" or light, more mineral dust could be added. If it appears too thick, more binder, water, or more root watering composition could be added. Likewise, forced heated air may be employed to "air condition" the mixture to yield the appropriate consistency. It is also contemplated that differing manufacturing conditions may require conditioning the mixture by forcing chilled air across and throughout the mixture. Once this conditioning process has yielded a desired consistency the mixture is agglomerated via, e.g., a pin mixer, to allow the materials to coagulate together and begin to form particles. "Agglomerating" refers to the processes of tumbling the slurry into itself, e.g., via a tumbler and various mixers/pelletizers to coagulate and harden the ingredients together.

A further step is to further agglomerate this, now somewhat coagulated mixture, e.g., in a disc or pan pelletizer to further coagulate the particles into granules. In some embodiments, the granules are substantially spherical.

Other methods of preparing the composition are contemplated. For example, mixing the plant root watering composition with the wood fiber and binder material(s), and then spraying this mixture over mineral dust inside a tumbler to agglomerate it, before proceeding.

The dissolvable granular compositions containing a root watering composition have numerous benefits compared to liquid root watering compositions. Previously, such liquid compositions required immediate watering or irrigation upon application. In contrast, with the present granular compositions, watering or irrigation can be delayed for up to 3-5 days. This is useful in the case of drought conditions, watering restrictions, or areas not amenable to liquid application. The granular format allows slow leaching of the root watering composition as the binder(s) dissolve(s) over time. Since the granular compositions can be used with existing turf or farm equipment, they can be applied in a conventional manner and can be applied, for example, at the time of seeding. Applications for the granular compositions include a broadcast application to turf, landscaping, containerized plants and agriculture.

The granular compositions described herein have improved shelf lives compared to liquid root watering compositions, since microbial action may occur with wet compositions which do not occur in dry format. This stability lends itself to other applications, such as inclusion into a potting mix or soils, for example. The potting mixes and soils are useful either in field application or in container. In other embodiments, the granular compositions can be mixed into or with other dry products, such as fertilizers, growth-promoting agents, insecticides, fungicides, soil amendments, and the like prior to application, either as a raw ingredient or mixed on site. The granular compositions can be mixed with sand for divot repair or top dressing materials. They can also be blended with seeding patch products. An additional use is as a seed coating.

Also included are methods of using the granular compositions in the manners noted above. Generally, the composition is best applied to soil surfaces, not directly to plant leaf or root systems. The present disclosure thus provides a method of amending a soil comprising distributing a granular root watering composition as described herein as an amendment to a soil. The distributing can include distributing the granules in a layer under the soil, within the soil, on the soil, or combinations thereof. The granular root watering composition can also be distributed proximate a root location corresponding to a plant.

Such methods can also include a step of exposing the granular composition to irrigation.

The granular root watering compositions of the invention provide greater efficacy compared to a control or to a standard liquid root watering composition of the same active ingredient makeup and volume, as demonstrated in Examples 1 and 2. Without being bound by theory, it is believed that the saccharide binder functions synergistically with the humectant component(s) of the plant root watering composition to produce a greater effect per volume of root watering composition applied as compared to a liquid application to the same volume of liquid root watering composition blended into the granular composition and then applied over the same area. A granular root watering composition of the invention compares in efficacy to a liquid root watering composition of the same makeup at a rate of at least 0.77:1, that is, about 30% more liquid composition is required to achieve the same efficacy as the granular compositions of the invention.

Another benefit of the granular root watering composition is that it does not have to be immediately watered in as compared to a standard liquid root watering composition, as demonstrated by Example 3. A liquid root watering composition must have immediate applied watering such that the composition reaches the root zone where it must persist to function. Testing of the granular root watering compositions of the present invention has shown that watering in is not required for several days, and in some instances may not be required at all due to natural humidity, rainfall, and/or other atmospheric conditions that provide sufficient water and/or water vapor to eventually degrade the components of the granular carrier, thereby releasing the root watering composition into the root zone of the plant(s). This delay in applied watering is of benefit to applicators of this composition in that this factor provides the ability to conserve resources pertaining to time, labor, and/or equipment.

The present application may be embodied in other forms without departing from the spirit or essential attributes thereof and, accordingly, reference should be had to the following claims rather than the foregoing specification as indicating the scope of the disclosure. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

EXAMPLES

Example 1

Increased Efficacy of Granular Composition Compared to Control

A granular carrier was impregnated with a liquid root watering composition herein described at a rate of 14.2 kg (31.33 lbs.) of granular carrier with 3,142 mL (0.83 U.S. gallons) of root watering composition. This ratio thus yielded 18.1 kg (40 lbs.) of granular material. This material was applied at a rate of 0.63 kg (1.38 lbs.) of granular composition to approximately 45.5 square meters (500 square feet) of turf using a physical barrier to create a discernible edge of applied granular composition, with a control of approximately 45.5 square meters immediately adjacent. Both plots received the same amount of water. The application of the granular composition produced a dramatic result in the appearance and growth of turf as compared to appearance and growth compared to control, indicating the efficacy of the granular root watering composition.

Example 2

Increased Efficacy of Granular Composition Compared to Liquid Composition

A granular carrier was impregnated with a liquid root watering composition herein described at a rate of 14.5 kg (32 lbs.) of granular carrier with 2,915 mL (0.77 U.S. gallons) of root watering composition. This ratio thus yielded 18.1 kg (40 lbs.) of granular material. This material was applied to 1347.1 square meters (14,500 square feet) of turf, alongside an application of 3,785 mL (1 U.S. gallon) of the same liquid root watering composition to an additional 1347.1 square meters of turf, with a control of a final plot of 1347.1 square meters. All plots received the same amount of applied watering. Plots with granular and liquid applications appeared similar in overall turf color and quality, while the control was perceptibly drier. This trial has shown that a granular root watering composition that uses a saccharide binder compares in efficacy to a liquid root watering composition of the same makeup at a rate of at least 0.77:1 of root watering composition.

Example 3

Efficacy Without Watering

A granular root watering composition was applied to an open, tilled field such that a sample amount of granular composition was spread somewhat haphazardly over the center section of the field immediately following the application of grass seed over the entire field. No water was applied. Several days later the seed began to germinate first in the area of the granular composition application. This indicates that additional water available to the roots of the germinating seedlings was provided by the granular composition, absent any applied watering as would be necessary in the application of a liquid root watering composition.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims.

What is claimed is:

1. A granular composition for root watering, comprising:
a water-dissolvable granular material impregnated with a plant root watering composition, the plant root watering composition comprising:
a humectant selected from the group consisting of sorbitol, molasses, potassium lactate, sodium lactate, glycerol, potassium acetate and sodium acetate, xylitol, erythritol, malitol, mannitol, isomalt, calcium nitrate, and urea,
a thickener,
a binder selected from the group consisting of calcium lignosulfonate, sodium lignosulfonate, a wheaten adhesive binder, and a potato dextrin adhesive binder, and
a wetting agent comprising a non-ionic surfactant; and
the water-dissolvable granular material comprising:
a mineral selected from the group consisting of granite, kaolin, titanium dioxide, sodium bicarbonate, lime, fly ash, and,
wood fiber, and
a saccharide binder selected from the group consisting of starch, dextrin, molasses, or mixtures thereof.

2. The granular composition of claim 1, wherein in the wetting agent comprises an alkylpolyglucoside (APG).

3. The granular composition of claim 1, wherein the granule size is from about 80 to 140 SGN.

4. The granular composition of claim 1, wherein the granule size is from about 150 to 240 SGN.

5. The granular composition of claim 1, wherein the granule size is from about 35 to 300 SGN.

6. The granular composition of claim 1 produced by a process comprising:
impregnating the water-dissolvable granular material with the plant root watering composition, wherein impregnating comprises contacting the water-dissolvable granular material with the root watering composition at a ratio of about 1.8:16.3 by weight to a ratio of about 6.8:11.3 by weight, wherein the plant root watering composition comprises the humectant from 30 to 60 parts by volume, the binder from 0.2 to 5.0 parts by volume, the thickener from 0.2 to 0.5 parts by volume, the wetting agent from 0.2 to 15.0 parts by volume, and water from 30 to 50 parts by volume, and wherein the granular material comprises 18-25 weight-% wood fiber and 82-75 weight-% mineral and binder, at 3-12 weight-% based on the total amount of mineral and wood fiber; and
drying the impregnated granular composition to obtain the granular composition.

7. The granular composition of claim 1 produced by the process of claim 6, wherein impregnating the water-dissolvable granular material with the plant root watering composition comprises:
spraying the plant root watering composition combined with the water onto the water-dissolvable granular material or
mixing the plant root watering composition combined with the water and the water-dissolvable granular material to obtain a slurry and agglomerating the slurry mixture, and
wherein the process further comprises, optionally, agglomerating the impregnated granular composition to form substantially spherical granules.

8. A method of preparing a granular composition for root watering, the method comprising:
impregnating a water-dissolvable granular material with a plant root watering composition at a ratio of about 1.8:16.3 by weight to a ratio of about 6.8:11.3 by weight,
wherein the plant root watering composition comprises:
a humectant in an amount from 30 to 60 parts by volume selected from the group consisting of sorbitol, molasses, potassium lactate, sodium lactate, glycerol, potassium acetate and sodium acetate, xylitol, erythritol, malitol, mannitol, isomalt, calcium nitrate, and urea;
a thickener in an amount from 0.2 to 0.5 parts by volume;
a binder in an amount from 0.2 to 5.0 parts by volume selected from the group consisting of calcium lignosulfonate; sodium lignosulfonate, a wheaten adhesive binder, and a potato dextrin adhesive binder;
a wetting agent in an amount from 0.2 to 15.0 parts by volume comprising a non-ionic surfactant; and
water from 30 to 50 parts by volume; and wherein the water-dissolvable granular material comprises:
  a mineral at 82-75 weight-% selected from the group consisting of granite, dolomite, kaolin, titanium dioxide, sodium bicarbonate, calcium carbonate, lime, fly ash, and gypsum;
  wood fiber at 18-25 weight-%; and
  a saccharide binder selected from the group consisting of starch, dextrin, molasses, or mixtures thereof, at 3-12 weight-% based on the total amount of mineral and wood fiber; and
drying the impregnated granular composition to obtain the granular composition.

9. The method of claim 8, wherein impregnating the water-dissolvable granular material with the plant root watering composition comprises mixing the plant root watering composition and the water-dissolvable granular material to obtain a slurry and agglomerating the slurry mixture.

10. The method of claim 9, wherein the method further comprises agglomerating the impregnated granular composition to form substantially spherical granules.

* * * * *